US012600329B2

(12) United States Patent
 Piccirillo et al.

(10) Patent No.: US 12,600,329 B2
(45) Date of Patent: Apr. 14, 2026

(54) ABS ACTUATOR DEVICE UNIT FOR A CARGO CYCLE AND A CARGO CYCLE PROVIDED WITH SUCH DEVICE

(71) Applicant: Blubrake S.p.A., Milan (IT)

(72) Inventors: Giuseppe Piccirillo, Milan (IT); Mattia Tabai, Milan (IT); Daniele Berretta, Milan (IT); Fabio Todeschini, Milan (IT)

(73) Assignee: BLUBRAKE S.P.A, Milan (IT)

( * ) Notice: Subject to any disclaimer, the term of this patent is extended or adjusted under 35 U.S.C. 154(b) by 321 days.

(21) Appl. No.: 18/251,834

(22) PCT Filed: Nov. 4, 2021

(86) PCT No.: PCT/IB2021/060198
§ 371 (c)(1),
(2) Date: May 4, 2023

(87) PCT Pub. No.: WO2022/097054
PCT Pub. Date: May 12, 2022

(65) Prior Publication Data
US 2025/0269830 A1 Aug. 28, 2025

(30) Foreign Application Priority Data
Nov. 6, 2020 (IT) ........................ 102020000026554

(51) Int. Cl.
*B60T 8/17* (2006.01)
*B60T 8/1761* (2006.01)
(Continued)

(52) U.S. Cl.
CPC .......... *B60T 8/1706* (2013.01); *B60T 8/1761* (2013.01); *B60T 8/3225* (2013.01); *B60T 8/344* (2013.01);
(Continued)

(58) Field of Classification Search
CPC .... B60T 8/1706; B60T 8/1761; B60T 8/3225; B60T 8/344; B62K 7/04; B62L 3/023; B62M 6/40
See application file for complete search history.

(56) References Cited

U.S. PATENT DOCUMENTS 10,967,931 B2 * 4/2021 Nishino .................... B62L 1/02
11,345,433 B2 * 5/2022 Takayama ............. B60T 8/1706
(Continued)

FOREIGN PATENT DOCUMENTS

CN 210235197 U 4/2020
DE 19508915 A1 9/1996
(Continued)

OTHER PUBLICATIONS

International Search Report and Written Opinion of International Application No. PCT/IB2021/060198, mailed Feb. 23, 2022, 14 pages.
(Continued)

*Primary Examiner* — Joseph J Dallo
(74) *Attorney, Agent, or Firm* — Heslin Rothenberg Farley and Mesiti P.C.; Victor A. Cardona, Esq.

(57) ABSTRACT

A pedal-assisted cargo bicycle, includes a front extension of the frame which rotatably supports a front fork shaft around an axis-spaced forward with respect to the rotation axis of the bicycle handlebar, and a luggage compartment container mounted on said front extension of the frame. The cycle has an ABS hydraulic actuator device interposed in the connection between a master hydraulic cylinder associated with the lever for actuating the front brake, and an actuator hydraulic cylinder of a brake caliper associated with the front wheel unit. The ABS actuator device and the electronic control unit associated therewith are mounted on a support plate which is in turn mounted on a side wall of a lower portion of the luggage compartment container, so as to be protected from (Continued)

Figure 1:

impacts against the ground even in a condition of maximum lateral inclination of the bicycle.

6 Claims, 5 Drawing Sheets

(51) Int. Cl.

| | | |
|---|---|---|
| *B60T 8/32* | (2006.01) | |
| *B60T 8/34* | (2006.01) | |
| *B62K 7/04* | (2006.01) | |
| *B62L 3/02* | (2006.01) | |
| *B62M 6/40* | (2010.01) | |

(52) U.S. Cl.
CPC ................ *B62K 7/04* (2013.01); *B62L 3/023* (2013.01); *B62M 6/40* (2013.01)

(56) References Cited

U.S. PATENT DOCUMENTS

| | | | |
|---|---|---|---|
| 11,975,797 B2* | 5/2024 | Tsai ........................... | B62L 1/00 |
| 2017/0182986 A1 | 6/2017 | Dackerman et al. | |

| | | | | |
|---|---|---|---|---|
| 2019/0152452 A1* | 5/2019 | Ishihara | ................ | B60T 8/1706 |
| 2019/0185093 A1* | 6/2019 | Nishino | .................. | B62M 6/40 |
| 2019/0225298 A1* | 7/2019 | Takahashi | ............ | B62J 45/4151 |
| 2019/0322329 A1* | 10/2019 | Sakaguchi | ............ | B60T 8/1706 |
| 2021/0284277 A1* | 9/2021 | Miura | ..................... | B62M 6/40 |

FOREIGN PATENT DOCUMENTS

| | | | | |
|---|---|---|---|---|
| DE | 202019105187 U1 | 10/2019 | | |
| DE | 102021105908 A1 * | 9/2021 | .............. | B60T 8/34 |
| EP | 3653478 A1 | 5/2020 | | |
| WO | 2019155371 A1 | 8/2019 | | |
| WO | 2019159060 A1 | 4/2020 | | |
| WO | 2020175981 A1 | 9/2020 | | |

OTHER PUBLICATIONS

Anonymous: "Manual Urban Arrow Family," Urban Arrow Manual, Version UAF-FM2017EN-0001, Mar. 1, 2017, XP055560313.

* cited by examiner

ABS ACTUATOR DEVICE UNIT FOR A CARGO CYCLE AND A CARGO CYCLE PROVIDED WITH SUCH DEVICE

CROSS REFERENCE TO RELATED APPLICATIONS

This application is a national stage filing under Section 371 of International Application No. PCT/IB2021/060198, filed Nov. 4, 2021, published in English on May 12, 2022, as WO 2022/097054 and which claims priority from Italian Patent Application No. 102020000026554 filed on Nov. 6, 2020, the entire disclosures of which are incorporated herein by reference.

FIELD OF THE INVENTION

The present invention relates to cargo cycles, in particular to cargo bicycles with electric motor for pedal assistance, of the type indicated in the preamble of claim 1.

PRIOR ART

Cargo bicycles are known and have been used over the years. They reveal significant safety problems, which arise—on the one hand—from the configuration of the bicycle itself, and—on the other hand—from the considerable difference in the vertical load on the front wheel, depending on whether the luggage compartment container is empty or full. A difference in load entails considerable differences in the conditions of adherence between the front wheel tyre and the ground, and in particular it entails problems of adherence when braking under a low load condition, also taking into account the fact that the braking device is generally configured to ensure adequate stopping distances in a fully loaded condition.

A cargo bicycle of the type indicated in the preamble of claim 1 is for example disclosed by EP 3 653 478 A1. Cargo bicycles are also disclosed by XP009512678 and WO 2020/175981 A1.

It is also observed that documents WO 2019/159060 A1, US 2017/182986 A1 and DE 20 2019 105187 U1 show that in general, in the bicycle industry, the use of an ABS actuator, in order to avoid the locking of a wheel during braking is already known.

OBJECT OF THE INVENTION

The object of the present invention is to improve the degree of safety of cargo bicycles of the type specified above, in particular pedal-assisted cargo bicycles.

A further object of the invention is to achieve the aforementioned objective using means that are simple and reliable in operation.

A further object of the invention is to allow the possibility of adapting a cargo bicycle according to the teachings disclosed by the present invention with simple operations, which substantially do not require any modification in the structure of the bicycle.

SUMMARY OF THE INVENTION

With a view to achieving one or more of the aforementioned objects, the present invention relates to a cargo cycle, in particular a pedal-assisted cargo bicycle, having the characteristics indicated in claim 1.

It should be observed that the general application of an ABS device on a bicycle, in particular on a pedal-assisted electric bicycle, has already been proposed for over the years. However, to the Applicant's knowledge, specific applications of ABS devices on cargo bicycles of the type indicated herein have not yet been proposed.

Studies and experiments conducted by the Applicant have shown that the application of an ABS device to a cargo cycle reveals problems greater than those normally encountered with ABS devices applied to conventional bicycles. The reason for these greater problems is related to the nature of the cargo cycles which, as already mentioned above, are subject to a high variability of the vertical load which weighs on the front wheel. This high load variability results in a considerable variation in the conditions of adherence between the front wheel and the ground, particularly during braking.

In order to overcome these problems, according to the invention, the braking system of the cargo cycle is configured as a function of a condition in which the luggage compartment container is fully loaded, whereas the ABS hydraulic actuator device is configured as a function of a condition in which the luggage compartment container is empty.

In this manner, maximum riding safety is achieved in the event of braking, irrespective of the load condition of the luggage compartment container.

In an embodiment, the ABS actuator device, and preferably also the electronic control unit associated therewith, are mounted below the aforementioned front extension of the frame, adjacent to a side wall of a lower portion of the luggage compartment container.

The positioning of the ABS actuator device unit on the lower part of the luggage compartment container is ideal—given that it is not subject to displacements during steering (unlike when device A is mounted on the fork)—it is protected, it is along the connection line between the brake lever and the front brake caliper, is easily accessible, it leaves ample space for installation and it also allows, if desired, the use of luggage compartment-container support tubes for fixing the unit. In the aforementioned position, access to the electric cable normally used for maintenance operations on the ABS actuator device is also facilitated, or alternatively, the protection casing can be opened with ease, in order to replace the actuator device or any of the components thereof.

According to a further preferred characteristic, the arrangement is such that when the bicycle is in a maximum condition of lateral inclination, in which one side of the lower wall of the luggage compartment container comes into contact with the ground, the unit comprising the ABS actuator device and the electronic control unit associated therewith remains in a protected area, spaced from the ground.

In a variant, the ABS hydraulic actuator device is directly mounted on said front extension of the frame, below said luggage compartment container, in a position such that in the condition of maximum lateral inclination of the cycle, said ABS actuator device and the electronic control unit associated therewith are spaced from the ground and therefore protected against impacts.

Given that it can be made in any known manner, the ABS actuator device will not be described in detail herein. For example, a device of this type is described in the document WO 2019/155371. Preferred embodiments of such device have been the subject of Italian patent applications IT 10 2020 000007480 and IT 10 2020 000007483 owned by the Applicant in question, filed on 8 Apr. 2020 and still not published at the priority date of this application.

DETAILED DESCRIPTION OF A PREFERRED EMBODIMENT

Figure 2:
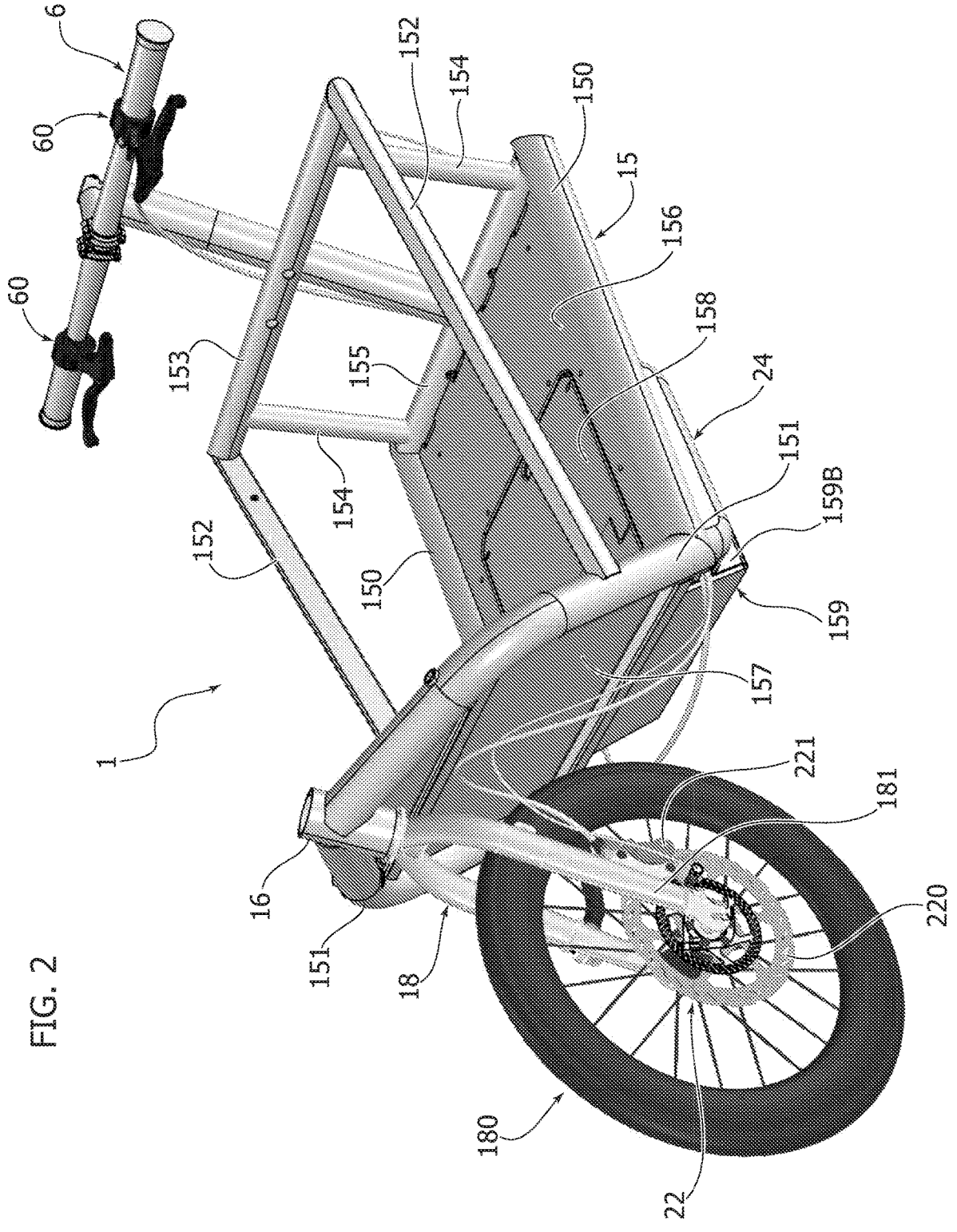
Figure 3:
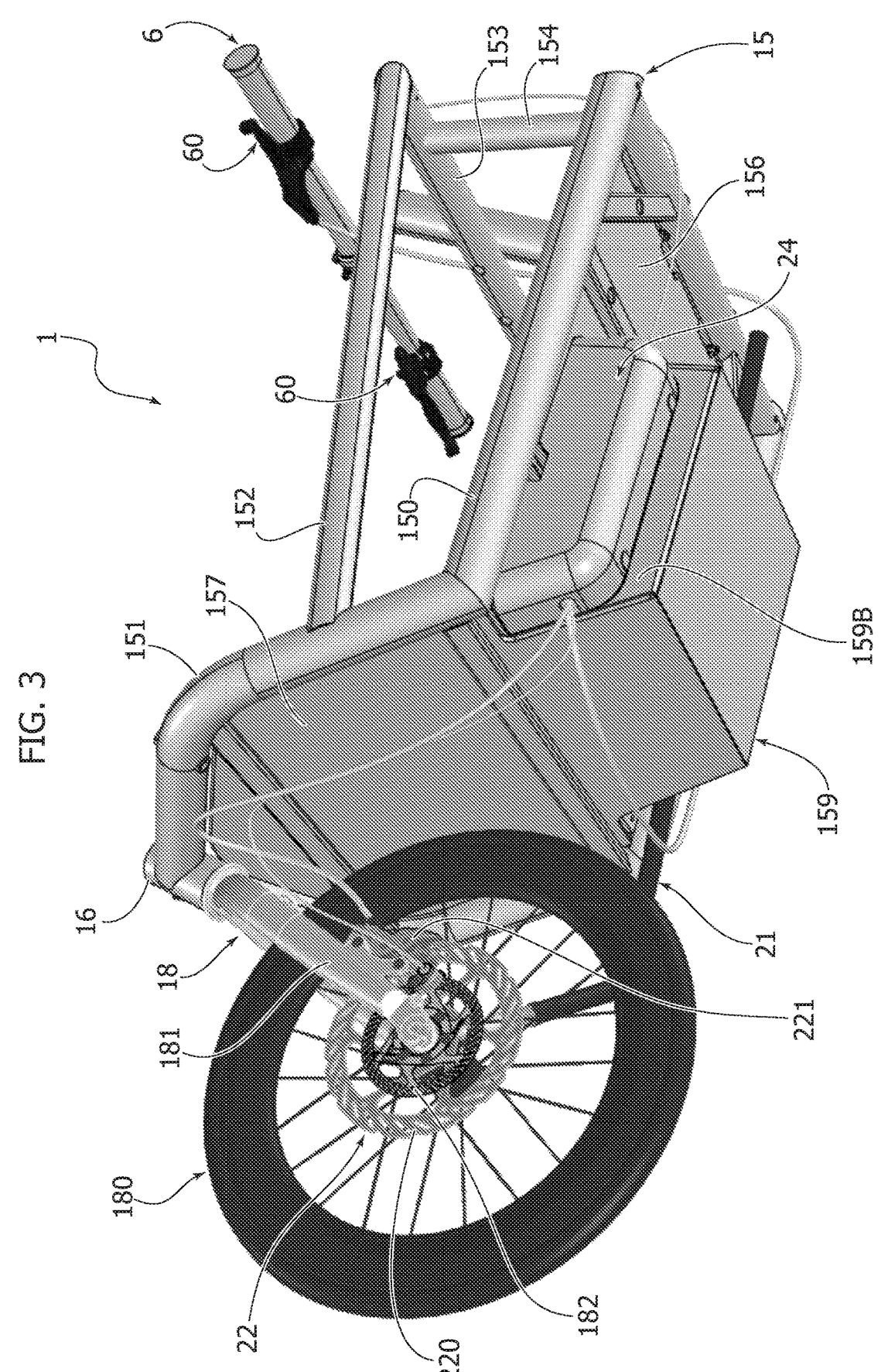
Figure 4:
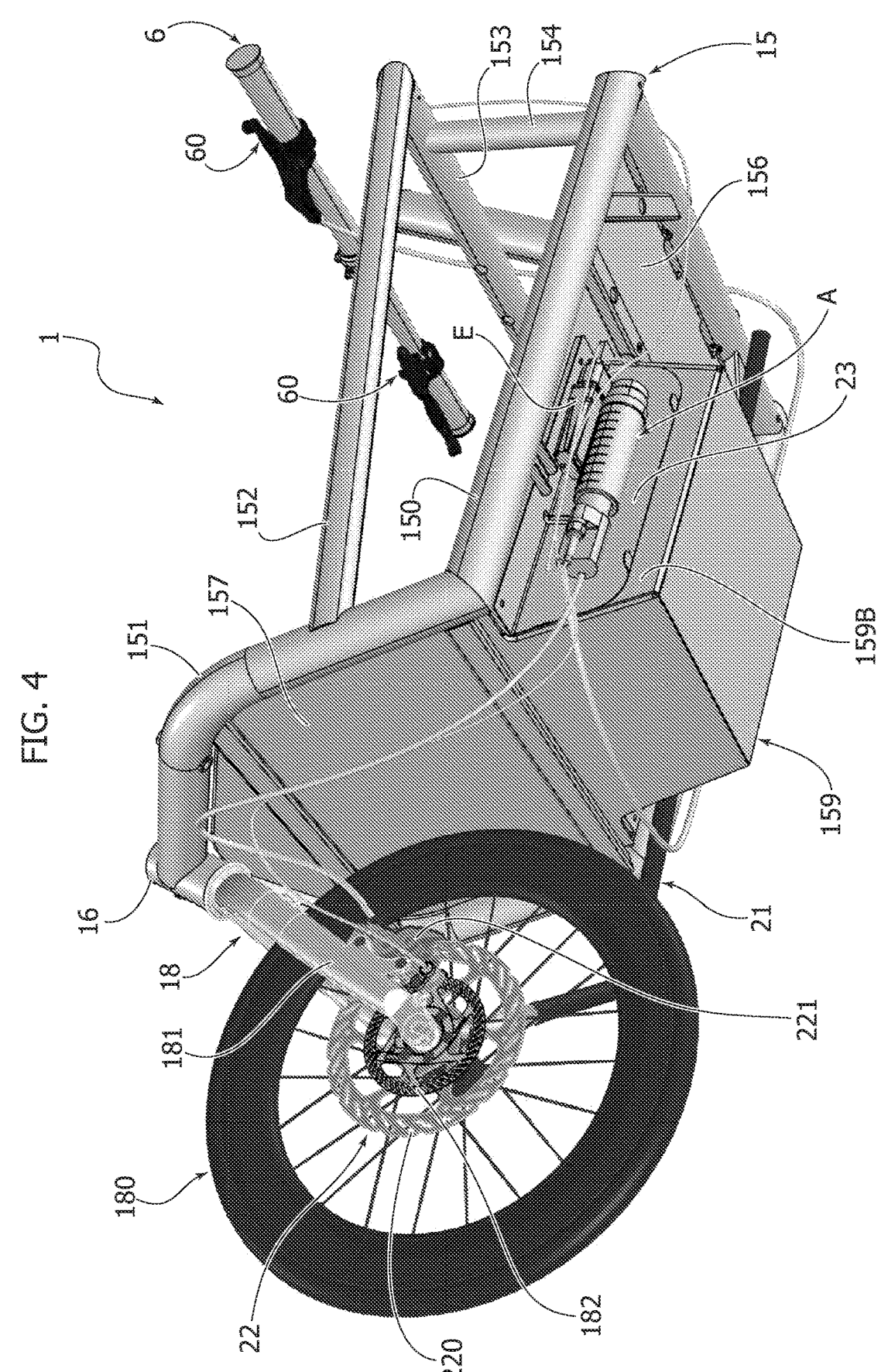
Figure 5:
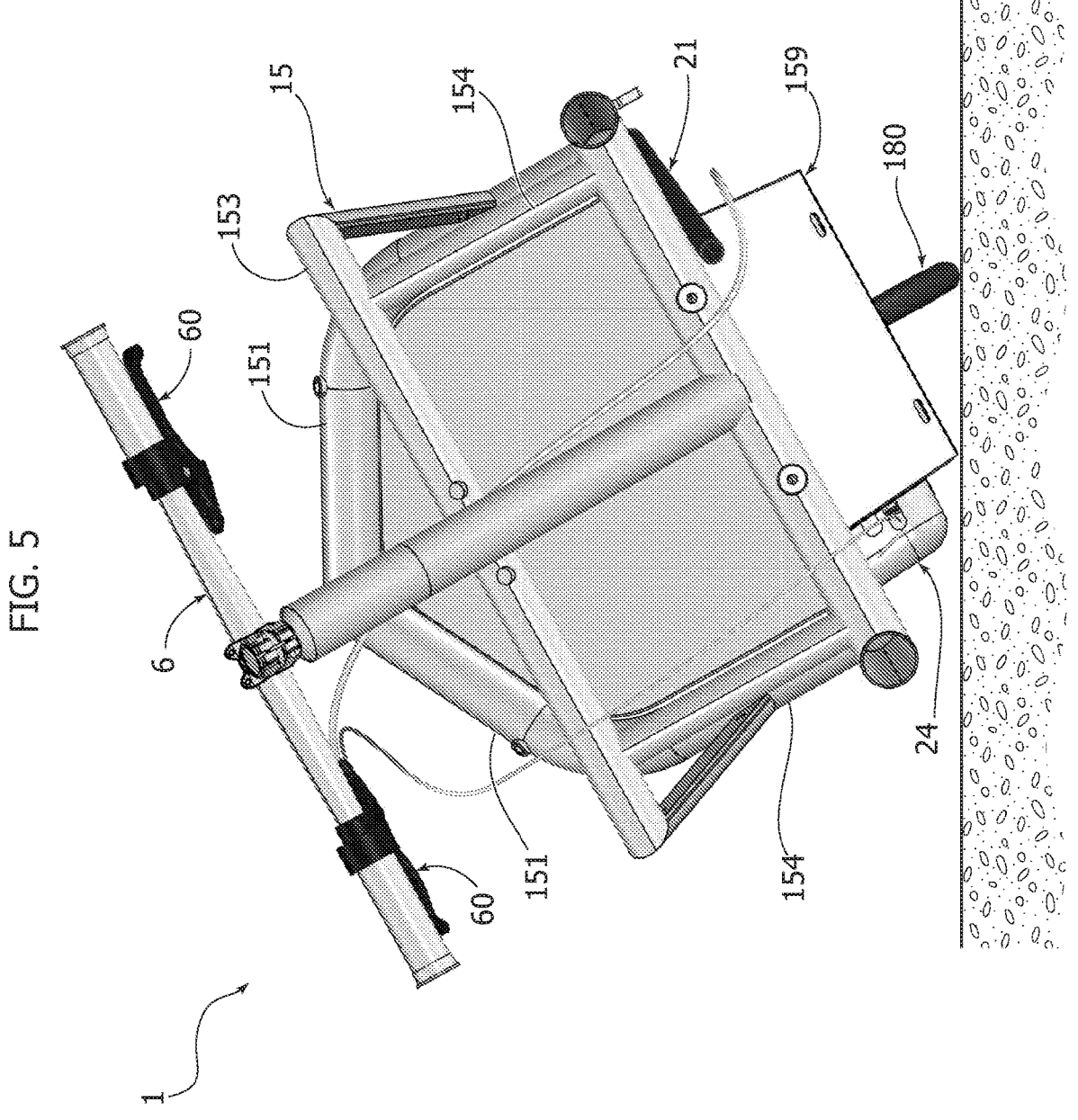

Further characteristics and advantages of the invention will be apparent from the description that follows with reference to the attached drawings, provided purely by way of non-limiting example, wherein:

FIG. 1 illustrates an example of embodiment of a cargo bicycle according to the invention, FIG. 2 is a perspective view of the lower part of the bicycle of FIG. 1, FIG. 3 is a further bottom perspective view of the unit of FIG. 2, illustrating the assembly of the unit including the ABS actuator device and the related electronic control unit, FIG. 4 is a view equivalent to that of FIG. 3, in which the protection casing of the ABS actuator device and of the electronic control unit was removed, and FIG. 5 is a rear view of the unit of FIGS. 2-4, and it shows that in the condition of maximum lateral inclination of the bicycle on the side in which the ABS actuator device is mounted, the latter remains spaced from the ground.

In FIG. 1, the reference numeral 1 indicates—in its entirety—an embodiment of the cargo bicycle according to the invention, including a bicycle frame 2 for example consisting of mutually welded tubular elements. The frame 2 includes a steering tube 3 which rotatably supports a shaft 5 or a handlebar 6 around an axis 4. According to the conventional technique, the frame 2 further includes a saddle tube 7 rigidly locked in which is the support stem of a saddle 8, rear forks 9, 10 which rotatably support a rear wheel unit 11 and a central movement shaft 12 connected to the pedal cranks 13 carrying respective pedals (not illustrated). Still according to the conventional technique, the shaft 12 carries a front ring gear 14 connected by means of a chain transmission with a rear pinion associated with the pin of the rear wheel 11. Obviously, the cargo bicycle 1 may also be provided with a speed change device of any known type, for selectively engaging the transmission chain on one of a series of rear pinions and/or on one of a series of front ring gears.

According to a typical configuration of cargo bicycles of this type, the frame 2 further includes a front extension of the frame, indicated in its entirety with reference numeral 15, which includes a fork tube 16 in which there is rotatably mounted the shaft 17 of a front fork 18, which rotatably supports the front wheel unit 180, which may be a single or dual wheel. The rotation axis 19 of the shaft 17 of the front fork 18 is significantly spaced forward with respect to the rotation axis 4 of the handlebar 6. The front extension 15 of the frame is used to support a luggage compartment container 20. Lastly, a steering linkage 21 connects the shaft 5 of the handlebar with the front fork 18 with the aim of transmitting the rotation of the handlebar to the front fork 18.

In particular with reference to FIGS. 2-5, the front extension 15 of the bicycle frame defines a cage-like structure consisting of mutually welded metal tubular elements. The cage-like frame 15 includes two lower longitudinal tubular elements 150, arranged at the two sides of the cage and connected—at the front—to two lateral uprights 151 whose upper ends converge toward the tube 16 in which there is rotatably mounted the shaft of the fork. The cage-like frame further includes two upper longitudinal lateral arms 152, whose front ends are connected to the uprights 151 and whose rear ends are connected to an upper crosspiece 153. The crosspiece 153 is in turn connected—by means of rear uprights 154—to a lower crosspiece 155 connected to the rear ends of the lower tubular elements 150.

Walls configured and arranged as desired may be associated with the cage-like frame 15 so as to define the luggage compartment container. The figures solely show a bottom wall 156, connected to the tubular elements 150 and to the lower crosspiece 155, and a front wall 157 connected to the two uprights 151. With reference to FIG. 2, still in the case of the specific example illustrated, the bottom wall 156 includes a hatch 158 for access to a lower portion of the luggage compartment container 159, better visible in FIGS. 3-5.

Still with reference to FIGS. 2 and 3, the cargo bicycle according to the invention is provided with a front hydraulic braking system which includes a front disc brake 22 including a disc 220 associated with the front wheel and a disc brake caliper 221 carried by an arm 181 of the fork 18 and cooperating with the disc 220.

In a per se known manner, the disc brake caliper 221 includes a hydraulic actuator cylinder (not illustrated) which can be actuated by means of a front brake lever 60, which—in the illustrated example—is associated with the handlebar 6. Still in a per se known manner, a master hydraulic cylinder (not illustrated) which is hydraulically connected to the brake caliper 221 using flexible pipes, is associated with the brake lever 60. The construction details of the disc brake 22, of the brake lever 60 and of the actuator cylinder associated therewith are not described or illustrated herein, given that they can be made in any known manner.

According to the invention, in the connection between the master hydraulic cylinder associated with the brake lever 60 and the actuator cylinder of the brake caliper 221 there is interposed an ABS actuator hydraulic device, indicated with "A" in FIG. 4. The ABS hydraulic actuator device A is associated with the electronic control unit E which is capable of controlling the action of the device A upon the detection of an incipient front wheel locking condition when braking. To this end, the bicycle is provided with one or more sensors suitable to detect an incipient locking condition of the front wheel when braking. In a per se known manner, such sensors may comprise, for example, a front wheel rotation speed sensor, carried by the fork arm 181 and cooperating with a phonic wheel 182 associated with the front wheel, and/or, for example, a sensor for detecting the vertical load on the rear wheel, suitable to detect when such load drops below a threshold value, indicating a tendency of the bicycle to tilt forward, around the axis of the front wheel.

When the electronic unit E detects an unsafe braking condition, based on the signal sent by one or more of the sensors described above, it activates the device A which reduces the pressure of the fluid supplied to the brake caliper. As previously mentioned, the construction details of the actuator device A are not described or illustrated herein, given that they can be made in any known manner.

In the embodiment illustrated herein, the device A and the electronic unit E are mounted below the front extension 15 of the bicycle frame, adjacent to a side wall 159B of the lower portion 159 of the luggage compartment container. More preferably, the device A and the electronic unit E are secured to a plate 23 in turn mounted on the aforementioned side wall 159B and protected by means of a covering casing 24 (FIG. 3) preferably applicable by means of a quick coupling to the plate 23 and equally easily removable, whenever there arises the need to carry out maintenance operations on the device A.

As observable in FIG. 5, the arrangement is such that in the condition of maximum lateral inclination of the bicycle, in which one side of the lower wall 159 of the container comes into contact with the ground, the casing 24 with the device A and the electronic unit E arranged therein is spaced from the ground and therefore protected from impacts.

Thanks to the arrangement described above, the ABS-equipped braking system may be adapted on a conventional cargo bike through simple and rapid operations and without the need to modify the structure of the bicycle in any manner whatsoever.

The positioning of the ABS actuator device unit on the lower part of the luggage compartment container is ideal—given that it is not subject to displacements during steering (unlike when device A is mounted on the fork)—it is concealed, it is along the connection line between the brake lever and the front brake caliper, it is easily accessible, it leaves ample space for installation and it also allows, if desired, the use of luggage compartment-container support tubes for fixing the unit.

In the aforementioned position, access to the electric cable normally used for maintenance operations on the ABS actuator device is also facilitated, or alternatively, the protection casing can be opened with ease, in order to replace the actuator device or any of the components thereof.

Obviously, without prejudice to the principle of the invention, the construction details and the embodiments may vary widely with respect to what is described purely by way of example, without departing from the scope of protection of the attached claims.

For example, a different arrangement of the unit containing the device A and/or the electronic control unit E on the bicycle may be provide for. Such unit could also be mounted directly on the front extension 15 of the frame, or it could also be associated with the arm 181 of the fork 18, adjacent to the brake caliper.

The invention claimed is:

1. Cargo cycle, in particular cargo bicycle with an electric motor for pedal assistance, comprising:
   a front wheel unit, with single or double wheel, carried by a front fork of the cycle,
   a frame, including a steering tube in which there is rotatably mounted a handlebar shaft connected to the handlebar of the cycle,
   a front extension of the frame of the cycle, which rotatably supports a shaft of the front fork of the cycle around an axis spaced forward with respect to the rotation axis of the handlebar of the cycle,
   a luggage compartment container mounted on the front extension of the frame, and
   a steering linkage which connects the handlebar shaft with the shaft of the front fork,
   wherein said cycle comprises a front hydraulic braking system including:
   a front disc brake associated with the front wheel and including a brake caliper provided with an actuator hydraulic cylinder,
   a master hydraulic cylinder associated with a lever for actuating the front brake, which-when actuated-transfers pressurised fluid to the actuator hydraulic cylinder of the brake caliper,

an ABS hydraulic actuator device, interposed in the hydraulic connection between the master hydraulic cylinder and the actuator hydraulic cylinder of the brake caliper and which can be activated to reduce the pressure of the fluid supplied to the actuator hydraulic cylinder when, following an actuation of the aforementioned brake lever, a tendency to locking the front wheel unit is detected, and an electronic control unit configured and programmed to activate said ABS hydraulic actuator device when-following the actuation of the aforementioned brake lever-said electronic control unit detects a tendency to locking the front wheel unit based on the information sent to said electronic control unit by one or more sensors; and said braking system configured on the basis of a condition in which the luggage compartment container is fully loaded, and the ABS hydraulic actuator device configured on the basis of a condition in which the luggage compartment container is empty;

said ABS hydraulic actuator device is mounted on said luggage compartment container;

wherein said electronic control unit is mounted adjacent to said ABS hydraulic actuator device;

the ABS hydraulic actuator device and/or the electronic control unit are mounted on a support plate provided with a covering casting which protects said actuator device and said electronic control unit, such that in a condition of maximum lateral inclination of the cycle, said ABS actuator device and the electronic control unit are spaced from the ground and protected from an impact with the ground.

2. Cargo cycle according to claim 1, wherein the actuator device is mounted below said front extension of the frame, on a side wall of a lower portion of said luggage compartment container.

3. Cargo cycle according to claim 1, wherein said ABS hydraulic actuator device is directly mounted on said front extension of the frame, below said luggage compartment container, in a position such that in the condition of maximum lateral inclination of the cycle, ABS actuator device and the electronic control unit associated therewith are spaced from the ground and therefore protected against impacts.

4. Cargo cycle according to claim 1, wherein said ABS hydraulic actuator device is mounted on an arm of the front fork of the cycle, adjacent to the brake caliper.

5. ABS actuator device unit for a cargo cycle according claim 1 further comprising a support plate of the ABS actuator device configured to be mounted on said frame extension or in said luggage compartment container, and provided with a casing for protecting said actuator device.

6. ABS actuator device unit according to claim 5, wherein said support plate and said protection casing are configured to also receive the electronic control unit of said ABS actuator device unit.

* * * * *